(12) United States Patent
Heuser et al.

(10) Patent No.: US 9,973,050 B2
(45) Date of Patent: May 15, 2018

(54) ASYNCHRONOUS MACHINE WITH OPTIMIZED DISTRIBUTION OF ELECTRICAL LOSSES BETWEEN STATOR AND ROTOR

(71) Applicant: Robert Bosch GmbH, Stuttgart (DE)

(72) Inventors: Patrick Heuser, Stuttgart (DE); Miguel Ruiz De Larramendi, Ludwigsburg (DE); Mercedes Herranz Gracia, Forchheim (DE)

(73) Assignee: Robert Bosch GmbH, Stuttgart (DE)

( * ) Notice: Subject to any disclaimer, the term of this patent is extended or adjusted under 35 U.S.C. 154(b) by 286 days.

(21) Appl. No.: 14/650,431

(22) PCT Filed: Oct. 15, 2013

(86) PCT No.: PCT/EP2013/071473
§ 371 (c)(1),
(2) Date: Jun. 8, 2015

(87) PCT Pub. No.: WO2014/090440
PCT Pub. Date: Jun. 19, 2014

(65) Prior Publication Data
US 2015/0311759 A1    Oct. 29, 2015

(30) Foreign Application Priority Data

Dec. 10, 2012 (DE) .................. 10 2012 222 616

(51) Int. Cl.
*H02K 3/28* (2006.01)
*H02K 17/16* (2006.01)
(Continued)

(52) U.S. Cl.
CPC ............. *H02K 3/28* (2013.01); *H02K 1/165* (2013.01); *H02K 3/12* (2013.01); *H02K 17/16* (2013.01);
(Continued)

(58) Field of Classification Search
CPC .. H02K 17/16; H02K 2213/03; H02K 17/205; H02K 1/165; H02K 3/28; H02K 3/12; Y02T 10/641
(Continued)

(56) References Cited

U.S. PATENT DOCUMENTS 4,831,301 A    5/1989    Neumann
7,741,750 B1   6/2010    Tang
(Continued)

FOREIGN PATENT DOCUMENTS

CN    101626182 A    1/2010
CN    101728910 A    6/2010
(Continued)

OTHER PUBLICATIONS

International Search Report for Application No. PCT/EP2013/071473 dated Mar. 12, 2015 (English Translation, 2 pages).

*Primary Examiner* — Bernard Rojas
(74) *Attorney, Agent, or Firm* — Michael Best & Friedrich LLP

(57) ABSTRACT

The invention relates to an asynchronous machine (1) as can be used particularly in electric vehicles or hybrid vehicles. The asynchronous machine (1) has a rotor (5) and a stator (3). The asynchronous machine is designed and controlled in such a manner that it has a pole pair number p of p=3. Because of the reduced yoke saturation that can consequently be achieved, the stator yoke (9) can be designed with a lesser height hy1, such that a ratio of the outer rotor diameter D2a to the outer stator diameter D1a can assume values between 0.7 and 0.8. As a result, enlarged rotor teeth (19) and correspondingly enlarged rotor grooves (21) can be formed in the rotor (5), such that electrical losses in the material in the rotor grooves (21) acting as the rotor coil element (23) are smaller in comparison to conventional asynchronous machines. The electrical losses occurring to a (Continued)

greater extent in the stator (3) compensating for this lead to a lesser warming of the stator (3) than would be the case with the rotor (5) as the stator (3) can be cooled by simple means. Overall, a higher continuous torque can thus be achieved with the asynchronous machine (1) according to the invention.

20 Claims, 2 Drawing Sheets

(51) Int. Cl.
*H02K 1/16* (2006.01)
*H02K 17/20* (2006.01)
*H02K 3/12* (2006.01)

(52) U.S. Cl.
CPC ....... *H02K 17/205* (2013.01); *H02K 2213/03* (2013.01); *Y02T 10/641* (2013.01)

(58) Field of Classification Search
USPC ........................................................ 310/210
See application file for complete search history.

(56) References Cited

U.S. PATENT DOCUMENTS

| | | | |
|---|---|---|---|
| 8,154,167 B2 | 4/2012 | Tang | |
| 2008/0036331 A1* | 2/2008 | Mizutani | ................ H02K 1/278 310/269 |
| 2011/0198962 A1* | 8/2011 | Tang | ........................ H02K 3/28 310/198 |
| 2015/0247530 A1* | 9/2015 | Lang | ................... F16C 32/0474 310/90.5 |

FOREIGN PATENT DOCUMENTS

| | | |
|---|---|---|
| DE | 1176269 | 8/1964 |
| EP | 280194 | 8/1988 |
| EP | 1248349 | 10/2002 |
| EP | 2202781 | 6/2010 |

\* cited by examiner

ASYNCHRONOUS MACHINE WITH OPTIMIZED DISTRIBUTION OF ELECTRICAL LOSSES BETWEEN STATOR AND ROTOR

BACKGROUND OF THE INVENTION

The present invention relates to an asynchronous machine by way of example in the form of an electrical asynchronous motor or a generator.

Electrical machines are being developed in order in the future by way of example to render it possible to drive electric vehicles or hybrid vehicles in an electrical manner or rather to be able to recoup kinetic energy of the vehicle into electrical energy. The electrical machine can function either as a motor or as a generator.

Various electrical machines are currently being further developed in particular for use in vehicles. In particular, efforts are being undertaken to optimize asynchronous machines for use in vehicles. Above all, for future road-going vehicles, the asynchronous machine for this purpose on the one hand should be as small and light as possible and on the other hand should be highly efficient whilst outputting as much power as possible and providing the maximum torque.

Asynchronous machines comprise a stator and a rotor as essential components. Similar to other electrical machines, one or multiple windings is/are housed in the stator with the aid of which it is possible to generate a rotating magnetic field in the stator. However, in contrast to many other types of electrical machines, magnets in the form of permanent magnets or electromagnets that are supplied with energy from the exterior are not provided on the rotor that can rotate relative to the stator. In lieu of said magnets, the rotor comprises a generally short-circuited conductor that is in part also described as a passive armature. The rotating magnetic field that is generated by the stator rotates with a so-called synchronous rotational speed that corresponds to the quotient $f_1/p$ from the fundamental frequency $f_1$ of the system that is supplying energy and the pole pair number p. As soon as the mechanical rotational speed of the rotor differs from the synchronous rotational speed, the rotor experiences a change in the magnetic flux. As a consequence, currents are induced in the short-circuited rotor conductors. A torque occurring between the stator and the rotor is produced by means of an interaction between the rotating magnetic field of the stator and the rotor currents.

One example of an asynchronous machine that is also in part described as an induction motor is described in EP 2 202 781 A2.

SUMMARY OF THE INVENTION

Embodiments of asynchronous machines in accordance with the present invention render possible inter alia an improved suitability for use in electric motor vehicles or electric hybrid vehicles. In particular, embodiments of the present invention render possible an asynchronous machine that, in comparison with conventional asynchronous machines, renders possible a higher continuous torque whilst simultaneously continuing to provide high torque densities.

An asynchronous machine is proposed that comprises a rotor and a stator that surrounds the rotor. The stator has a stator outer diameter D1a. The stator comprises an exterior lying stator yoke having a stator yoke height hy1. In addition, the stator comprises multiple teeth that project radially inwards from the stator yoke and said teeth have a stator tooth height hz1 and a mean stator tooth width bmz1. The stator comprises stator coil elements that are arranged in stator grooves between adjacent stator teeth. The rotor has a rotor outer diameter D2a. The rotor comprises an inner lying rotor yoke having a rotor yoke height hy2, multiple rotor teeth that project radially outwards from the rotor yoke, said rotor teeth having a rotor tooth height hz2 and a mean rotor tooth width bmz2, and also multiple rotor coil elements that are arranged in each case between adjacent rotor teeth in rotor grooves. The asynchronous machine is characterized by three cooperating features: firstly, the asynchronous machine comprises a pole pair number of 3; secondly, a ratio of rotor outer diameter D2a with respect to stator outer diameter D1a is selected in such a manner that said ratio lies between 0.7 and 0.9, preferably between 0.7 and 0.8; and thirdly, a ratio of stator tooth height hz1 with respect to rotor tooth height hz2 is selected in such a manner that it lies between 0.3 and 0.6.

Embodiments of the asynchronous machine that are proposed herein can be regarded inter alia as relating to the ideas and findings that are described hereinunder.

Asynchronous machines are used in vehicles inter alia as a result of their high reliability and their high level of efficiency in areas that are relevant to driving cycles. In order where necessary to be able to provide a high torque density in the short term, suitably changing magnetic fields are generated with the aid of the windings that are provided in the stator in order to induce high rotor currents in the short circuited conductor that is provided in the rotor.

However, high electrical losses within the rotor also occur as a result of high rotor currents of this type due to the significant electrical resistance within the short-circuited conductor. Since these losses are output at the rotor and this causes the temperature of the rotor to increase, the temperature of the rotor vastly increases in the case of a high torque output or rather power output. An active, direct cooling arrangement of the rotor is only possible with considerable additional outlay and the additional costs that are associated with this outlay. Without a cooling arrangement of this type, the rotor achieves a limit temperature at some point in time, wherein damage to components of the rotor can occur. By way of example, the mechanical rigidity of materials reduces typically with the temperature so that the mechanical stability of the rotor is not ensured in the case of temperatures that are too high. In the case of the limit temperature being exceeded, it is possible for cracks to occur and in extreme cases for the mechanical destruction of the components to occur. It is therefore necessary as soon as the rotor temperature approaches the limit temperature to limit the torque that is provided by the machine, in other words, a vehicle control process can no longer demand the full torque.

A fundamental idea of the asynchronous machine that is proposed herein can be regarded as displacing the electromagnetic losses that occur in the asynchronous machine at least in part from the rotor into the stator since the stator can generally be cooled in a much more simple and efficient manner.

In order to achieve this, the above briefly mentioned and claimed measures are undertaken. Details of these measures and their possible effects and interdependencies are described hereinunder.

Firstly, the asynchronous machine and in particular its stator are embodied and controlled in such a manner that the asynchronous machine comprises a pole pair number of 3.

The pole pair number p is the number of pairs of magnetic poles within a rotating electrical machine. In a minimal configuration of p=1, an electrical machine comprises only one pole pair, in other words one magnetic north pole and one magnetic south pole. In the case of a polarity reversal of the magnetic field that is caused by the stator, the rotor rotates about 180°. Machines having a pole pair number of p=3 are embodied and controlled in such a manner that along the circumference of the stator there are three magnetic north poles and three magnetic south poles that are arranged in an alternating manner. In the case of a polarity reversal of the magnetic field, the rotor consequently only rotates about 60°.

Most asynchronous machines were hitherto used with a pole pair number of p=2 for use in motor vehicles. However, the inventors of the present described asynchronous machine have realized that in the case of conventional asynchronous machines of this type having a pole pair number 2, it is difficult to appreciably reduce the electrical losses that occur in the rotor.

It is therefore proposed to embody the asynchronous machine with a pole pair number 3. An asynchronous machine of this type having the pole pair number 3 has in other respects similar geometry of the machine components and rotational speed that is produced in an identical manner, indeed a lower torque than an asynchronous machine having a pole pair number 2. However, the yoke saturation within the stator yoke is in the case of a machine having the pole pair number 3 considerably less than in the case of a machine having the pole pair number 2 so that the stator yoke can be dimensioned in a smaller manner, in other words can comprise a smaller dimension in the radial direction that is described as the stator yoke height $hy1$.

As a result of the smaller amount of space that is required for the stator yoke, the geometry of the asynchronous machine that is proposed can be changed in comparison to conventional asynchronous machines in the case of outer measurements that remain identical in such a manner that firstly, the outer diameter of the rotor can be selected as larger than in the case of conventional asynchronous machines and therefore a ratio of the rotor outer diameter with respect to the stator outer diameter is greater, and by way of example can lie in the range of 0.7 to 0.9 preferably 0.7 to 0.8 and that secondly, the height of the rotor teeth and consequently of the space that is available for the rotor coil elements between adjacent rotor teeth can be increased so that a decreased ratio of stator tooth height with respect to rotor tooth height occurs that by way of example can lie in the range of 0.3 to 0.6.

With the aid of the formerly mentioned measures, in other words, enlarging the rotor outer diameter, it is possible as a result of an associated raising of the lever arm for generating the torque to compensate to a large extent for the loss in torque that occurs as a result of the transition from an asynchronous machine with a pole pair number 2 to an asynchronous machine with a pole pair number 3. The proposed asynchronous machine in the case of identical outer dimensions is therefore able to provide an identical torque density as is the case in the case of conventional asynchronous machines. By way of example, an asynchronous machine that comprises for example a stator outer diameter in the range of 130 to 240 mm can be designed for the purpose of generating a torque density of between 35 Nm/l and 70 Nm/l in order to generate by way of example a torque in the range of 40 Nm to 350 Nm.

In addition, the possible enlargement of the rotor outer diameter renders possible an increase in the rotor groove surface, in other words, an increase in the cross sectional surface for receiving the rotor coil elements that is available between two adjacent rotor teeth since with a larger selected rotor outer diameter, the height of the rotor teeth can also be selected as larger. As a result of increasing the size of the rotor groove surface in this manner, it is possible to reduce the electrical resistance within a short circuited conductor that is used as a rotor coil element, said resistance being inversely dependent upon this cross sectional surface. Finally, as a consequence, the electrical losses within the rotor during operation of the asynchronous machine can be considerably reduced. In the case of short-term torque that remains identical, a reduction of the rotor losses by up to 40% can occur. In contrast, increased losses that occur within the stator do not lead to fundamental limitations during operation of the asynchronous machine since the heat that is generated in connection with this process can be dissipated with the aid of a direct cooling arrangement that is simple to achieve on the stator.

Altogether, the reduced power losses in the rotor lead to a possibility of increasing continuous torque that is to be provided by the asynchronous machine.

Within the framework of the above proposed measures for changing the pole pair number to 3 and also the relative enlargement of the rotor outer diameter and the rotor tooth height it is possible to improve the remaining geometry of the components of the proposed asynchronous machine further for an optimized electrical and/or magnetic distribution.

By way of example, the stator yoke height $hy1$ and the rotor yoke height $hy2$ can be dimensioned in a similarly sized manner and preferably differ from one another by less than 20%.

The mean stator tooth width $bmz1$ or the mean rotor tooth width $bmz2$ can be dimensioned in dependence upon a stator and rotor groove number $N1$, $N2$ approximately as follows: $bmz1=hy/(N1/(6p))$ and $bmz2=hy/(N2/(6p))$. The tooth widths can be varied by way of example in a range of plus or minus 20% so that in the case of a pole pair number p=3, the following dependencies can occur:

$$0.8*(hy1/(N1*18)) \le bmz1 \le 1.2*(hy1/(N1*18))$$

and $$0.8*(hy2/(N2*18)) \le bmz2 \le 1.2*(hy2/(N2*18))$$

A cross sectional surface of the stator grooves and also iron paths that occur from the stator yoke height $hy1$, the rotor yoke height $hy2$, the mean stator tooth width $bmz1$ and the mean rotor tooth width $bmz2$ can be selected in such a manner that an electrical current density in one of the stator grooves lies at a short-term limit of maximal 40 $A/mm^2$ and simultaneously an induction in the stator yoke in the rotor yoke and in the stator teeth and rotor teeth lies in a saturation range of 1.7 to 2.0 T. The term 'short-term limit of the current density' can be understood to mean a thermal dependent maximal current density that a stator winding can withstand for a short time of a few seconds. The saturation range occurs by virtue of the fact that iron has a non-linear magnetization characteristic curve in which, after a specific point, in other words when the saturation state is reached, flux will no longer increase linearly with the current, rather a disproportionally large increase in current is required to achieve a small increase in flux. As a result of establishing the maximal short-term current density and the maximal induction in iron, an optimal utilization of the machine is achieved.

Reference is made to the fact that embodiments of the present invention are described herein in part in relation to the entire asynchronous machine and in part in relation to individual components, such as for example the stator and the rotor, of said asynchronous machine. A person skilled in the art will identify that the possible features can be substituted or combined in a suitable manner in order in this manner to achieve further embodiments and preferably synergy effects.

BRIEF DESCRIPTION OF THE DRAWINGS

Embodiments of the present invention are described hereinunder with reference to the attached figures, wherein neither the figures nor the description are to be designed as limiting the invention.

The figures are only schematic and are not to scale. Identical or identically functioning features are identified in the figures with identical reference numerals.

DETAILED DESCRIPTION

Figure 1:
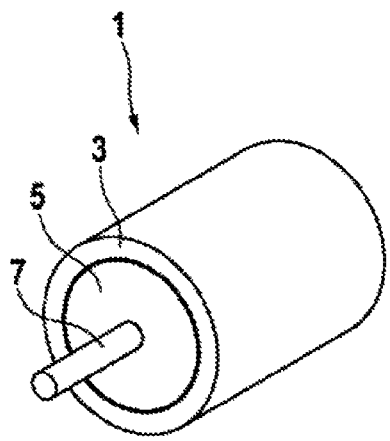
FIG. 1 illustrates a perspective view of an asynchronous machine.

FIG. 1 illustrates an asynchronous machine 1 in accordance with an embodiment of the present invention. The asynchronous machine 1 comprises a stator 3, a rotor 5 and a shaft 7. The stator 3 surrounds the rotor 5 in an annular manner. The rotor 5 is consequently received within the stator 3 in such a manner as to be able to rotate about the shaft 7. The stator 3 and rotor 5 comprise a cylindrical form.

Figure 3:
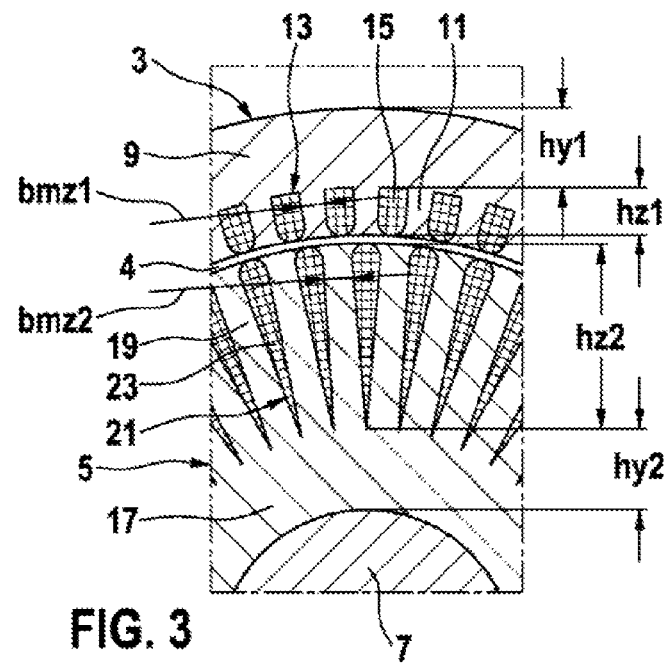
FIG. 3 illustrates an enlarged part view in the cross section of an asynchronous machine in accordance with an embodiment of the present invention.
Figure 2:
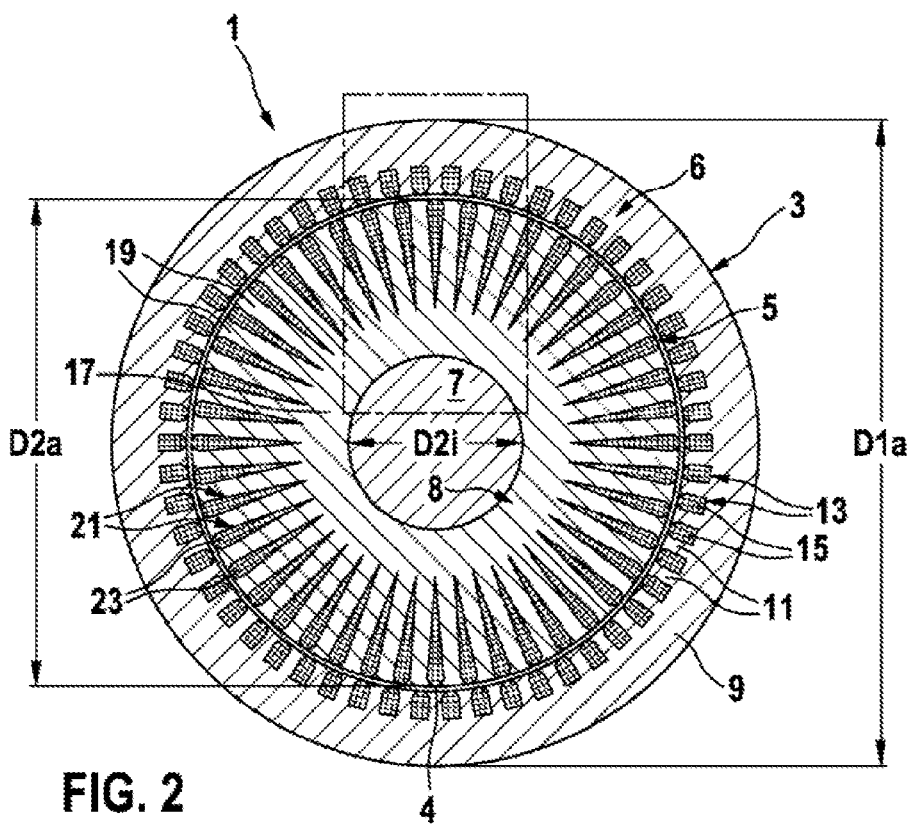
FIG. 2 illustrates a cross sectional view of an asynchronous machine in accordance with an embodiment of the present invention.

FIGS. 2 and 3 illustrate an electrical machine 1 in the cross section and also an enlarged section of such a cross section. A small gap 4 is embodied between the stator 3 and the rotor 5. Both the stator 3 and also the rotor 5 comprise a plurality of lamellae 6, 8 that are arranged in the axial direction one after the other.

The stator 3 comprises a stator yoke 9 that lies on the exterior. The stator yoke 9 is annular or rather cylindrical in shape. A dimension of the stator yoke 9 is described in the radial direction as stator yoke height hy1. Stator teeth 11 project inwards from the stator yoke 9. The stator teeth 11 comprise a stator tooth height hz1 and a mean stator tooth width bmz1. Both the stator 9 and also the stator teeth 11 comprise essentially a magnetizable, preferably ferromagnetic material such as for example iron or magnetic steel sheet. A material having a good electrical conductivity such as copper or aluminum is received in the stator grooves 13 that are formed between adjacent stator teeth 11 and said material is used to form stator coil elements 15.

The rotor 5 comprises an inner-lying rotor yoke 17 that is likewise embodied in an annular, in particular cylindrical manner. Rotor teeth 19 project outwards from the rotor yoke 17. The dimensions of the stator yoke 17 and also of the rotor teeth 19 are described as rotor yoke height hy2, rotor tooth height hz2 and mean rotor tooth width bmz2. The rotor yoke 17 and the rotor teeth 19 are also essentially embodied from a magnetizable, preferably ferromagnetic material such as by way of example iron or magnetic steel sheet. Rotor grooves 21 are located between adjacent rotor teeth 19 and a material that is highly electrically conductive such as for example copper or aluminum is received in said rotor grooves and is used to form rotor coil elements 23. The rotor coil elements 23 can be embodied as temporarily or permanently short-circuited conductor structures.

The outer diameter of the rotor 5 is described with D2$a$ and is the sum of the diameter D2$i$ of the shaft 7, the rotor yoke height hy2 and the rotor tooth height hz2. The outer diameter of the stator 3 is described as D1$a$ and results from the sum of the rotor outer diameter D2$a$, the width of the gap 4, the stator yoke height hy1 and the stator tooth height hz1.

The stator coil elements 15 are arranged, interconnected and controlled in such a manner that a pole pair number of 3 is provided for the asynchronous machine 1, in other words a rotating total magnetic field having three magnetic north poles and three magnetic south poles is set. For this purpose, in each case more than one of the stator coil elements 15 that extend in parallel to the shaft 7 are supplied with a current in the same direction. The magnetic field that is generated by the stator coil elements 15 is essentially concentrated in the stator yoke 3 and the stator teeth 11 and is then transferred from the stator 3 to the rotor 5 in particular into its rotor teeth 19 and the rotor yoke 17.

Since each of the six magnetic poles only extend within an angular region of 60° in the stator 3, the yoke saturation in the case of the stator 3 of the proposed asynchronous machine 1 is smaller than in the case of an asynchronous machine having the pole pair number of 2 so that both the stator yoke height hy1 and also the stator tooth height hz1 can have smaller dimensions. In the case of identical stator outer diameter D1$a$ of by way of example 150 mm, the rotor outer diameter D2$a$ can consequently be larger than in the case of conventional asynchronous machines and in the proposed case, can lie in the range of 105 to 120 mm. Accordingly, the rotor tooth height hz2 and in connection therewith the cross sectional surface of the rotor grooves 21 can be larger.

Since the stator grooves 13 in the case of the proposed asynchronous machine 1 are consequently smaller in relation to the rotor grooves 21 than in the case of conventional asynchronous machines, the total electrical losses that occur in the asynchronous machine 1 are distributed more easily to the stator 3 that can be cooled in a simple manner, whereas fewer heat losses have to be absorbed by the rotor 5 that can only be cooled with difficulty.

Figure 4:
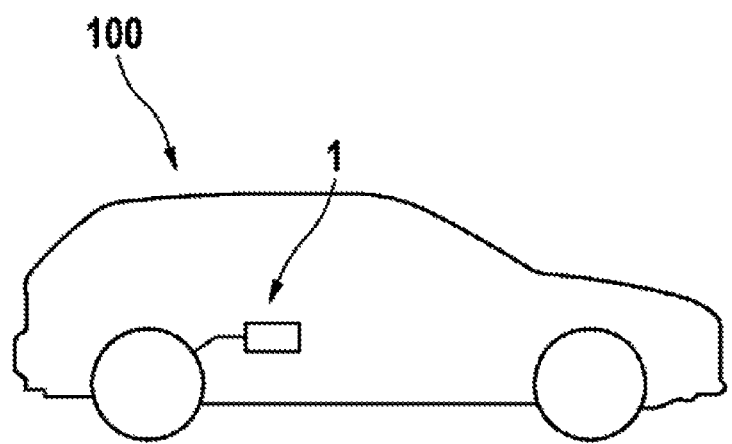
FIG. 4 illustrates a vehicle in accordance with an embodiment of the present invention.

FIG. 4 illustrates schematically a motor vehicle 100 having an asynchronous machine 1 in accordance with the invention. In the illustrated example, the asynchronous machine 1 drives the rear wheels of the motor vehicle. However, a front wheel drive or an all-wheel drive is also possible.

What is claimed is:
1. An asynchronous machine (1) comprising:
a rotor (5), and
a stator (3) that surrounds the rotor (5),
wherein the stator (3) has a stator outer diameter D1$a$ and comprises an outer-lying stator yoke (9) having a stator yoke height hy1, multiple stator teeth (11) that project radially inwards from the stator yoke (9), said stator teeth having a stator tooth height hz1 and a mean stator tooth width bmz1, and also multiple stator coil elements (15) that are in each case arranged between adjacent stator teeth (11) in stator grooves (13),
wherein the rotor (5) has a rotor outer diameter D2$a$ and an inner-lying rotor yoke (17) having a rotor yoke height hy2, multiple rotor teeth (19) that project radially outwards from the rotor yoke (17), said rotor teeth having a rotor tooth height hz2 and a mean rotor tooth width bmz2, and also multiple rotor coil elements (23) that are arranged in each case between adjacent rotor teeth (19) in rotor grooves (21), and wherein the asynchronous machine (1) comprises a pole pair number p of p=3, a ratio of rotor outer diameter D2a with respect to stator outer diameter D1a lies between 0.7 and 0.9, and a ratio of stator tooth height hz1 with respect to rotor tooth height hz2 lies between 0.3 and 0.6; and wherein the mean stator tooth width bmz1 dependent upon a stator groove number N1 lies in a range of bmz1=0.8*(hy1/(N1*18)) to bmz1=1.2*(hy1/(N1*18)).

2. The asynchronous machine as claimed in claim 1, wherein the stator yoke height hy1 differs from the rotor yoke height hy2 by less than 20%.

3. The asynchronous machine as claimed in claim 1, wherein the mean rotor tooth width bmz2 dependent upon a rotor groove number N2 lies in a range of bmz2=0.8*(hy2/(N2*18)) to bmz2=1.2*(hy2/(N2*18)).

4. The asynchronous machine as claimed in claim 1, wherein a cross sectional surface of the stator grooves (13) and also iron paths that occur as a result of the stator yoke height hy1, the rotor yoke height hy2, the mean stator tooth width bmz1 and the mean rotor tooth width bmz2 are selected in such a manner that an electrical current density lies in one of the stator grooves (13) at a short-term limit of maximal 40 A/mm2 and simultaneously an induction in the stator yoke, in the rotor yoke (17) and in the stator teeth and rotor teeth lies in a saturation range of 1.7 to 2.0 T.

5. The asynchronous machine as claimed in claim 1, wherein the stator outer diameter D1a lies in the range of 130 to 240 mm.

6. The asynchronous machine as claimed in claim 1, wherein the asynchronous machine (1) is configured to generate a torque density of between 35 Nm/liter and 70 Nm/liter.

7. A motor vehicle (100) having an asynchronous machine (1) in accordance with claim 1, said asynchronous machine being a recuperation generator.

8. A motor vehicle (100) having an asynchronous machine (1) in accordance with claim 1, said asynchronous machine being a drive motor.

9. The asynchronous machine as claimed in claim 2, wherein the mean stator tooth width bmz1 dependent upon a stator groove number N1 lies in a range of bmz1=0.8*(hy1/(N1*18)) to bmz1=1.2*(hy1/(N1*18)).

10. The asynchronous machine as claimed in claim 9, wherein the mean rotor tooth width bmz2 dependent upon a rotor groove number N2 lies in a range of bmz2=0.8*(hy2/(N2*18)) to bmz2=1.2*(hy2/(N2*18)).

11. The asynchronous machine as claimed in claim 10, wherein a cross sectional surface of the stator grooves (13) and also iron paths that occur as a result of the stator yoke height hy1, the rotor yoke height hy2, the mean stator tooth width bmz1 and the mean rotor tooth width bmz2 are selected in such a manner that an electrical current density lies in one of the stator grooves (13) at a short-term limit of maximal 40 A/mm2 and simultaneously an induction in the stator yoke, in the rotor yoke (17) and in the stator teeth and rotor teeth lies in a saturation range of 1.7 to 2.0 T.

12. The asynchronous machine as claimed in claim 11, wherein the stator outer diameter D1a lies in the range of 130 to 240 mm.

13. The asynchronous machine as claimed in claim 12, wherein the asynchronous machine (1) is configured to generate a torque density of between 35 Nm/liter and 70 Nm/liter.

14. An asynchronous machine (1) comprising:

a rotor (5), and a stator (3) that surrounds the rotor (5), wherein the stator (3) has a stator outer diameter D1a and comprises an outer-lying stator yoke (9) having a stator yoke height hy1, multiple stator teeth (11) that project radially inwards from the stator yoke (9), said stator teeth having a stator tooth height hz1 and a mean stator tooth width bmz1, and also multiple stator coil elements (15) that are in each case arranged between adjacent stator teeth (11) in stator grooves (13), wherein the rotor (5) has a rotor outer diameter D2a and an inner-lying rotor yoke (17) having a rotor yoke height hy2, multiple rotor teeth (19) that project radially outwards from the rotor yoke (17), said rotor teeth having a rotor tooth height hz2 and a mean rotor tooth width bmz2, and also multiple rotor coil elements (23) that are arranged in each case between adjacent rotor teeth (19) in rotor grooves (21), and wherein the asynchronous machine (1) comprises a pole pair number p of p=3, a ratio of rotor outer diameter D2a with respect to stator outer diameter D1a lies between 0.7 and 0.9, and a ratio of stator tooth height hz1 with respect to rotor tooth height hz2 lies between 0.3 and 0.6, and wherein the mean rotor tooth width bmz2 dependent upon a rotor groove number N2 lies in a range of bmz2=0.8*(hy2/(N2*18)) to bmz2=1.2*(hy2/(N2*18)).

15. A motor vehicle (100) having an asynchronous machine (1) in accordance with claim 14, said asynchronous machine being a drive motor.

16. A motor vehicle (100) having an asynchronous machine (1) in accordance with claim 14, said asynchronous machine being a recuperation generator.

17. The asynchronous machine as claimed in claim 14, wherein the stator yoke height hy1 differs from the rotor yoke height hy2 by less than 20%.

18. The asynchronous machine as claimed in claim 14, wherein a cross sectional surface of the stator grooves (13) and also iron paths that occur as a result of the stator yoke height hy1, the rotor yoke height hy2, the mean stator tooth width bmz1 and the mean rotor tooth width bmz2 are selected in such a manner that an electrical current density lies in one of the stator grooves (13) at a short-term limit of maximal 40 A/mm2 and simultaneously an induction in the stator yoke, in the rotor yoke (17) and in the stator teeth and rotor teeth lies in a saturation range of 1.7 to 2.0 T.

19. The asynchronous machine as claimed in claim 14, wherein the stator outer diameter D1a lies in the range of 130 to 240 mm.

20. The asynchronous machine as claimed in claim 14, wherein the asynchronous machine (1) is configured to generate a torque density of between 35 Nm/liter and 70 Nm/liter.

* * * * *